United States Patent [19]

Choi

[11] Patent Number: 5,757,495
[45] Date of Patent: May 26, 1998

[54] CHECKING DEVICE FOR FLATNESS OF A DRIVE CHASSIS OF A DISC PLAYER

[75] Inventor: Young-Suk Choi, Seoul, Rep. of Korea

[73] Assignee: Daewoo Electronics Co., Ltd., Seoul, Rep. of Korea

[21] Appl. No.: 753,878

[22] Filed: Dec. 2, 1996

[30] Foreign Application Priority Data

Nov. 30, 1995 [KR] Rep. of Korea ............... 95-45183
Nov. 30, 1995 [KR] Rep. of Korea ............... 95-45184
Dec. 15, 1995 [KR] Rep. of Korea ............... 95-41725

[51] Int. Cl.⁶ .................................................. G01B 11/30
[52] U.S. Cl. ............................................................ 356/371
[58] Field of Search ................................. 356/371, 376, 356/237, 445–448

[56] References Cited

U.S. PATENT DOCUMENTS 3,749,496  7/1973  Hietanen et al. ................... 356/371
4,412,743  11/1983  Eberly ................................. 356/371

FOREIGN PATENT DOCUMENTS 2199137  6/1988  United Kingdom .

Primary Examiner—David C. Nelms
Assistant Examiner—Amanda Merlino
Attorney, Agent, or Firm—Beveridge, DeGrandi, Weilacher & Young LLP

[57] ABSTRACT

A supporting part for supporting a drive chassis has a bottom surface, side walls formed to be bent upwardly from the bottom surface, and combining projectors projected on the top surface of the side walls which are inserted into combining holes of the drive chassis. A guide rod is installed parallel with and on the driving chassis. A master pickup has a detecting lens reflecting an incident light. A transporting part has a first light sensing portion installed at a top thereof and a rack gear portion formed on a bottom surface of the supporting part. The transporting part is movable parallel with the supporting part by the rack gear portion. The master pickup can be moved parallel with a surface of the drive chassis wherein the master pickup is guided by a guide rod is conjunction with the movement of the transporting part. The first light sensing portion is displaced directly vertical above the master pickup and arranged to focus coinciding with the detecting lens so that a beam which is downwardly projected from the first light sensing portion is reflected and returned by the detecting lens. The first light sensing portion senses a returned beam and determines whether the drive chassis is flat.

20 Claims, 3 Drawing Sheets

5,757,495

CHECKING DEVICE FOR FLATNESS OF A DRIVE CHASSIS OF A DISC PLAYER

BACKGROUND OF THE INVENTION

1. Field of the Invention

The present invention relates to a checking device for flatness of a drive chassis of a disc player, and more particularly to a checking device for flatness of a drive chassis of a disc player for precisely checking flatness over the whole surface of a drive chassis in which a turntable and an optical pickup device are installed in a disc player.

2. Description of the Prior Art

Generally, an appliance such as an optical video disc player, digital audio disc player and compact disc player is an apparatus for performing recording or reproducing operation with respect to a disc capable of magnetic recording or optical recording. The above mentioned disc player has commonly has a drive chassis being mounted with a turntable and an optical pickup on the upper part thereof, with a driving motor for driving the turntable and the optical pickup on the lower part thereof. After a disc with various sound signals and image signals are loaded on the turntable of disc player, the disc and the turntable are rotated together by the driving motor installed on the lower part of the drive chassis, whereby information is to be reproduced. U.S. Pat. Nos. 5,228,023 and 4,771,971 disclose examples of construction and operation of the conventional turntable assembly, optical pickup, and driving motor.

When the disc is reproduced by the disc player, it is necessary that the turntable and the optical pickup be transported with precision for the brilliant reproduction of sound or image, and it is necessary that the drive chassis be flat without tilting or twisting for the precise transportation. The drive chassis is produced by pressing, and it is desired that the disc player be constructed after checking the flatness of the drive chassis.

The conventional checking device for flatness of a drive chassis of a disc player will be described with reference to FIGS. 1 and 2 below.

FIG. 1 is a front sectional view showing the conventional checking device for flatness of a drive chassis of a disc player, and FIG. 2 is a plan view showing the checking device for flatness of the drive chassis of the disc of FIG. 1.

Here, reference numeral 20 denotes a drive chassis checking device 20 for checking flatness of a drive chassis 10 which is produced by pressing. The drive chassis checking device 20 has side walls 22 bent upwardly from the edges of a bottom surface thereof. A plurality of combining projectors 26 are on the top surfaces of the side walls 22.

The drive chassis 10 is installed on the drive chassis checking device 20. The drive chassis 10 is provided with combining holes 16 made to correspond with positions of the combining projectors 26. The drive chassis 10 is supported on the drive chassis checking device 20 in the state that the combining projectors 26 are inserted in the combining holes 16. The drive chassis 10 is provided with an opening 12 formed at the center thereof so that a pickup can be moved in the opening 12.

A plurality of checking rods 24 are formed at the same height as the side walls on the bottom surface of the drive chassis checking device 20. The checking rods 24 have contact-sensing sensors respectively on the top thereof. The sensor is for sensing contact with the bottom surface of the drive chassis 10. When the drive chassis 10 makes contact with all of the checking rods, it is determined that the drive chassis 10 is flat.

According to the conventional checking device for flatness of the drive chassis of the disc player as described above, the drive chassis checking device 20 supports the drive chassis 10 in the state that the combining projectors 26 are inserted in the combining holes 16, and the bottom surface of the drive chassis 10, if it is flat, makes contact with all of the checking rods 24 which are formed at the same height as the side walls on the bottom surface of the drive chassis checking device 20.

Under this state, the driving chassis checking device 20 is switched on, and the contact-sensing sensor attached at the top of the checking rod senses and displays a contact with the drive chassis, whereby flatness of the drive chassis 10 is checked.

The above-mentioned conventional checking device for flatness of the drive chassis of the disc player, however, can not check the whole surface of the drive chassis 10 but is limited to only the parts in which checking rods 24 with the contact-sensing sensors are installed. Accordingly, precise checking for an inferior drive chassis can not be performed. In the disc player, mischecking of the inferior drive chassis generates malfunctions in reproducing and tracking and focusing.

SUMMARY OF THE INVENTION

It is an object of the present invention to provide a checking device for flatness of a drive chassis of a disc player for precisely checking flatness over the whole surface of a drive chassis in which a turntable and an optical pickup device are installed in a disc player.

To achieve the above object of the present invention, a checking device for flatness of a drive chassis of a disc player includes a supporting part for supporting a driving chassis, the supporting part having a bottom surface, side walls formed to be bent upwardly from edges of the bottom surface, and combining projectors projected on top surface of the side walls and installed at positions corresponding to combining holes of the drive chassis into which the combining projectors are to be inserted;

a driving part for generating a driving force, the driving part being installed on the supporting part, and having a spindle gear rotatable by the driving force;

a master pickup being movable in a parallel direction with a surface of the drive chassis in a state that the master pickup is guided by a guide rod which is supported on the driving chassis and parallel with the driving chassis, the master pickup having a detecting lens reflecting an incident light;

a transporting part having a first light sensing portion installed at a top thereof for projecting light in a vertical downward direction from an upper part of the drive chassis which is installed on the supporting part for checking flatness of the drive chassis, the transporting part having a rack gear portion formed on a bottom surface in a parallel direction with the supporting part, the rack gear portion being movable parallel with the supporting part by rotation of the spindle gear in an engaged state with the spindle gear of the driving part, and the transporting part making contact with the master pickup so that the master pickup can be moved by a movement of the rack gear portion of the transporting part.

The supporting part has the bottom surface in a shape of a flat board, four side walls which are orthogonal to each other, the combining projectors which are projected on top surfaces of two opposite side walls, and the supporting part

3 having stairs formed on top surfaces of the other two opposite side walls for stably combining with the drive chassis.

The transporting part has a body portion bent upwardly from the rack gear portion and extended to an upside of the drive chassis, and the optical pickup makes contact with the body portion and can be moved depending on movement of the body portion.

The first light sensing portion installed at the top of the transporting part senses a beam which is projected from the first light sensing portion and then is returned by the detecting lens below the sensing portion, so that a determination can be made whether the drive chassis which is arranged parallel with and below the master pickup.

The master pickup is so constructed that one end is guided by guide rod supported on the drive chassis and the other end is directly supported by a contacting projector so that the master pickup is movable parallel with the surface of the drive chassis. The contacting projector has a hemispheric shape and contacts with the upper surface of the drive chassis.

Furthermore, the opposite side walls of the supporting part are determined in height so that one side wall close to a starting position of a checking operation is lower and the other side wall close to a ending position of the checking operation is higher, such that the master pickup is stably transported depending on movement of the transporting part.

A bracket part has a supporting plate which is extended to an upper part from the supporting part and an upper plate which is bent parallel with an upper surface of a turntable mounted on the drive chassis and which is extended to be positioned above the turntable. The bracket has a second light sensing portion installed on a bottom of the upper plate thereof for projecting light to the turntable and for sensing light returned from the turntable in order to check a rotating state of the turntable.

According to the above mentioned checking device for flatness of the drive chassis of the disc player of the present invention, in the state that the master pickup is movable on and parallel with the drive chassis by the transporting part which is movable on and parallel with the supporting part, the first light sensing portion installed at the top of the transporting part projects a beam of light in a vertical downward direction and senses a beam of light reflected and returned from the detecting lens of the master pickup installed therebelow, whereby flatness of the drive chassis is checked.

That is, if the beam of light projected in a vertical downward direction from the first light sensing portion is directly returned, the drive chassis installed parallel with the master pickup is determined to be flat.

Furthermore, when the turntable on the drive chassis is rotated, the second light sensing portion installed at the top of the bracket part projects a beam of light in a vertical downward direction toward the turntable and senses a beam of light which is reflected and returned from the detecting lens, whereby flatness of the drive chassis when the turntable is mounted is checked.

Thus, it is possible to precisely check tilting or twisting over the whole surface of the drive chassis as the turntable and the optical pickup device are moved over the whole surface of the drive chassis.

Therefore, precise checking for components is accomplished and the properties of the recording/reproduction of information and tracking and focusing servos are improved due to precise checking.

4

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

Hereinbelow, a checking device for flatness of a drive chassis of a disc player according to the present invention will be described in detail with reference to the accompanying drawings.

Figure 1:
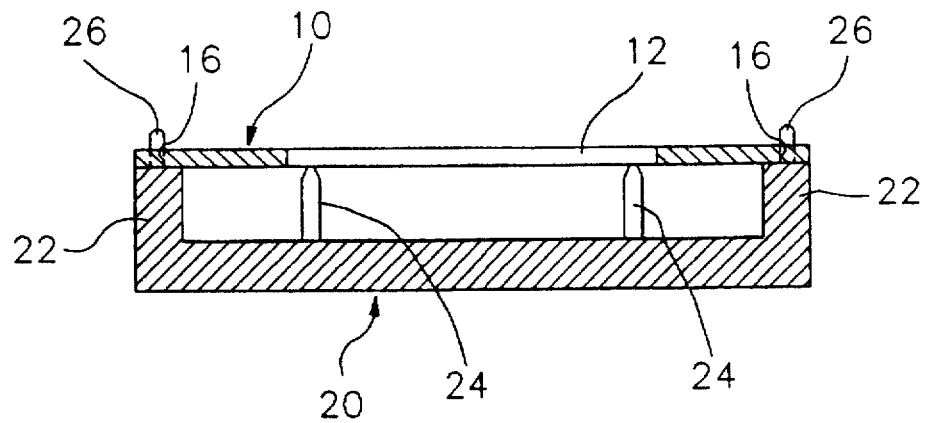
FIG. 1 is a front sectional view showing the conventional checking device for flatness of a drive chassis of a disc.
Figure 2:
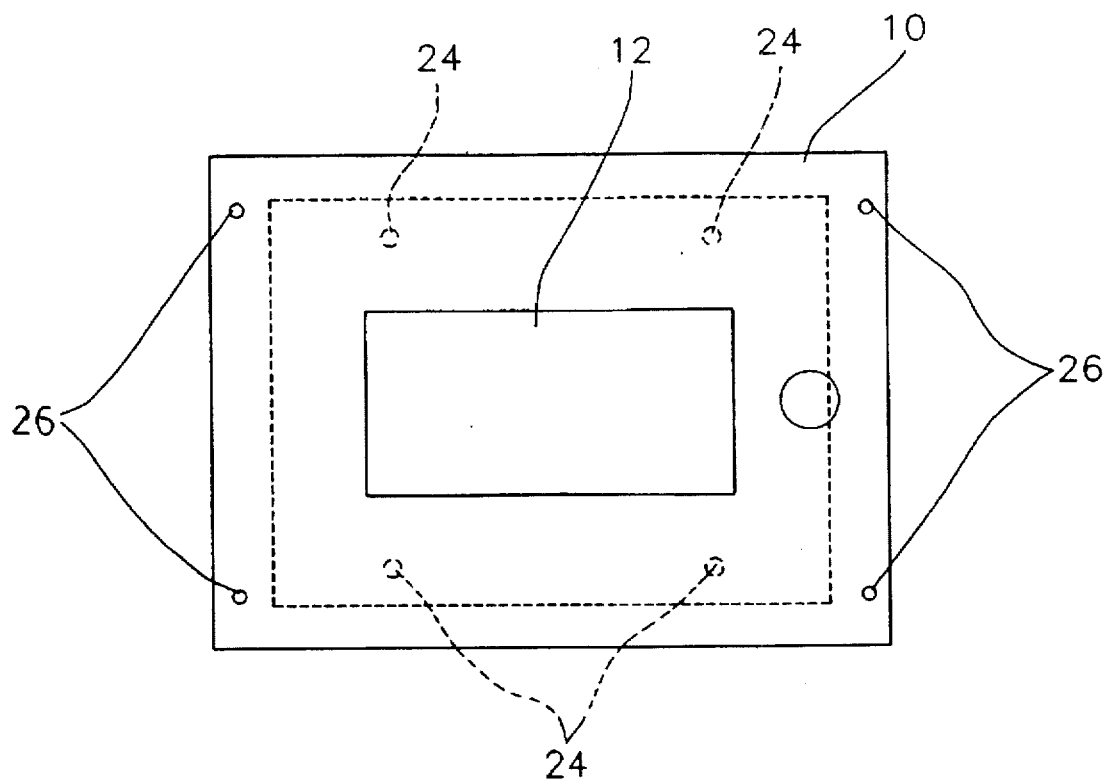
FIG. 2 is a plan view showing the checking device for flatness of the drive chassis of the disc of FIG. 1.
Figure 3:
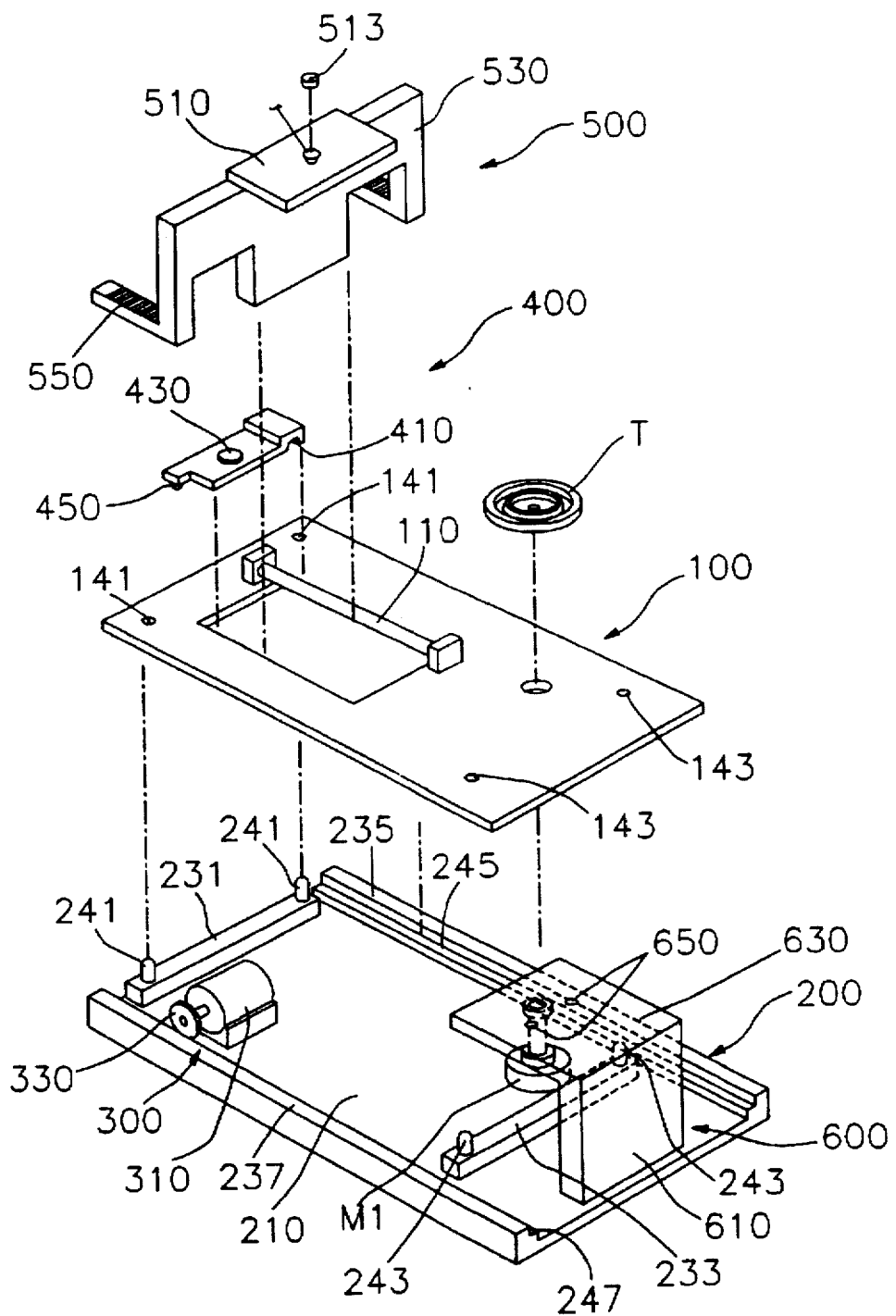
FIG. 3 is a front sectional view showing a checking device for flatness of a drive chassis of a disc player according to the present invention.
Figure 4:
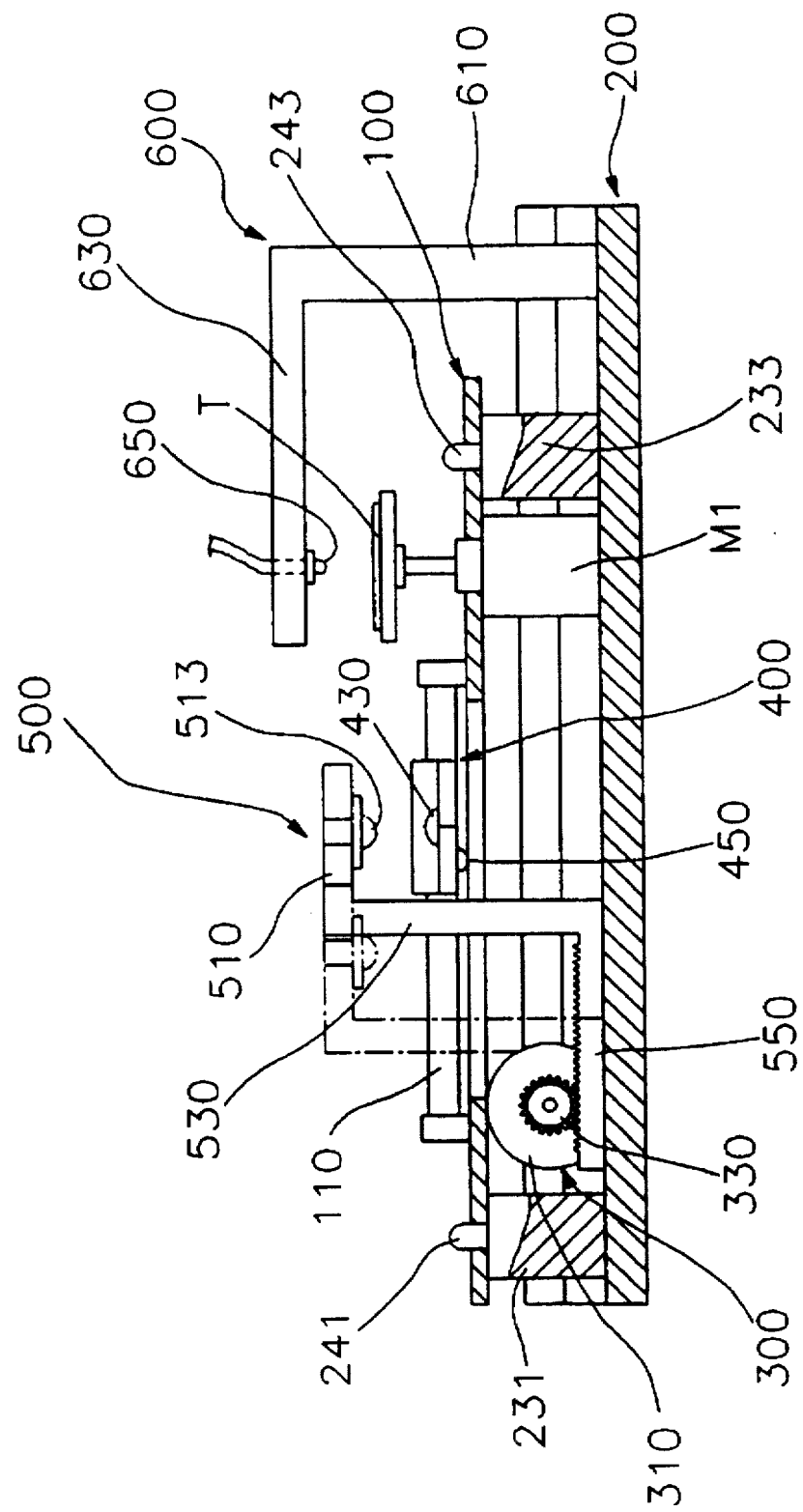
FIG. 4 is a plan view showing the checking device for flatness of the drive chassis of the disc of FIG. 3.

FIG. 3 is a front sectional view showing a checking device for flatness of a drive chassis of a disc player according to the present invention, and FIG. 4 is a plan view showing the checking device for flatness of the drive chassis of the disc of FIG. 3.

As illustrated in FIGS. 3 and 4, a supporting part 200 has the bottom surface 210 in the shape of a flat board for supporting a driving chassis 100. Four side walls 231, 233, 235, 237 which are orthogonal to each other are formed to be bent upwardly from the edges of the bottom surface 210. Combining projectors 241, 243 are upwardly projected on corresponding positions of the top surfaces of two opposite side walls 231, 233 of the four side walls. Combining projectors 241, 243 are inserted into combining holes 141, 143 formed at the edges of the drive chassis 100. The supporting part 200 has stairs 245, 247 inwardly formed on the top surfaces of the other two opposite side walls 235, 237, and the supporting part 200 is stably set on the drive chassis 100 by the stairs 245, 247.

A driving part 300 is installed on a predetermined position of the supporting part 200. The driving part 300 has a driving motor 310 for generating a driving force and a spindle gear 330 rotatable by the driving force.

A guide rod 110 is supported on the drive chassis 100 in parallel with the surface of the drive chassis 100.

A master pickup 400 is installed on the driving chassis 100. A triangular groove 410 is formed at one end of the master pickup 400, and the triangular groove 410 is guided by guide rod 110 supported on the drive chassis 100. A contacting projector 450 is formed at the other end of the master pickup 400, and the other end is directly supported by the contacting projector 450. Heights of both sides of the master pickup 400 are determined so that the surface of the master pickup 400 is parallel with the surface of the drive chassis 100 and movable along the guide rod 110. The contacting projector 450 has a hemispheric shape for smooth movement and makes contact with the upper surface of the drive chassis 100. The master pickup 400 has a detecting lens 430 with a predetermined diameter. The detecting lens 430 can be identical with the objective lens of the optical pickup actuator, and thus the objective lens of the optical pickup actuator can be replaced as the detecting lens in the same position that the detecting lens 430 is installed.

A transporting part 500 has a rack gear portion 550 formed on a bottom surface in a parallel direction with the supporting part 200. The rack gear portion 550 is engaged with the spindle gear 330 of the driving part 300 and moved parallel with the supporting part 200 by rotation of the spindle gear 330. The transporting part 500 has a body portion 530 bent upwardly from the rack gear portion 550 and extended to an upside of the drive chassis 100. The transporting part 500 has a first light sensing portion 513 installed at the top 510 bent from a top of the body portion 530 for projecting a beam of light in a vertical downward direction. When the master pickup 400 is arranged to be in contact with the body portion 530 of the transporting part 500, the first light sensing portion 513 is displaced directly vertical above the master pickup 400 and arranged to focus coinciding with the detecting lens 430. Since the master pickup 400 is in contact with the body portion 530 of the transporting part 500, the master pickup 400 can be transported depending on movement of the transporting part 500.

Furthermore, heights of the opposite side walls 231, 233 of the supporting part 200 can be determined so that one side wall 231 close to a starting position of a checking operation by the transporting part 500 and the master pickup 400 is lower and the other side wall 233 close to a ending position of the checking operation is higher. Thus, the master pickup 400 can be stably transported depending on movement of the transporting part 500.

A spindle motor M1 is installed at a lower part of the drive chassis 100 in the state that the motor shaft penetrates the drive chassis 100, and thus the motor shaft is displaced at the upper part of the drive chassis 100. A turntable T is press-fit for mounting a disc at the rotating shaft of the spindle motor M1. A bracket part 600 has a supporting plate 610 which is extended to an upper part from the supporting part 200 and an upper plate 630 which is bent parallel with an upper surface of a turntable mounted on the drive chassis 100 from the supporting plate 610 and which is extended directly vertical above the turntable T. The bracket part 600 has a second light sensing portion 650 having a plurality of light sensors installed on a bottom of the upper plate 630 thereof for projecting a beam of light to the turntable T and for sensing a beam of light returned from the turntable T in order to check a rotating state of the turntable T.

Now, an operation of the above mentioned checking device for flatness of the drive chassis of the disc player will be described.

As shown in FIG. 4, the drive chassis 100 is supported on the supporting part 200. The combining projectors 241, 243 upwardly projected on the top surfaces of two opposite side walls 231, 233 of the four side walls are inserted into combining holes 141, 143 which are formed at corresponding positions of the edges of the drive chassis 100. The supporting part 200 is stably set on the drive chassis 100 by the stairs 245, 247 formed on the top surfaces of the other two opposite side walls 235, 237.

The spindle gear 330 is rotated by the driving motor 310 of the driving part 300 installed on the bottom 210 of the supporting part 200. The transporting part 500 is moved along a parallel direction with the supporting part 200 by the rack gear portion 550 engaged with the spindle gear 330. The master pickup 400 which is arranged to be in contact with the body portion 530 of the transporting part 500 is transported by the transporting part 500 along the guide rod 110 supported on the drive chassis 100.

At that time, the first light sensing portion 513 installed at the top 510 of the transporting part 500 projects a beam of light in a vertical downward direction.

If the drive chassis 100 is flat at the point, since the first light sensing portion 513 is displaced directly vertical above the master pickup 400 and arranged to focus coinciding with the detecting lens 430, the projected beam is reflected by the detecting lens 430 and directly returned to the first light sensing portion 513. The first light sensing portion 513 senses the returned beam and determined the point of the drive chassis 100 to be flat.

If the drive chassis 100 is not flat at the point, the beam projected from the first light sensing portion 513 and reflected by the detecting lens 430 is returned with an angular error or not returned. At that time, the first light sensing portion 513 determines the point of the drive chassis 100 not to be flat.

The above mentioned checking operation is carried out over the whole surface of the drive chassis 100 as the transporting part 300 and the master pickup 400 are moved over the whole surface of the drive chassis 100. Therefore, it is possible to precisely check tilting or twisting over the whole surface of the drive chassis 100.

Furthermore, the turntable T which is coaxial with the motor shaft is rotated by a rotation of the spindle motor M1 installed at the lower part of the drive chassis 100.

At the time, a beam of light is projected from a projected sensing portion 650 installed on the bottom of the upper plate 630.

If the turntable T is uprightly mounted, the projected beam is reflected by the turntable T and directly returned to the second light sensing portion 650. The first light sensing portion 513 senses the returned beam and determines the point of the drive chassis 100 to be flat.

If the drive chassis 100 is not flat at the point, the beam projected from the first light sensing portion 513 and reflected by the detecting lens 430 is returned with an angular error or not returned. At that time, the first light sensing portion 513 determines the point of the drive chassis 100 not to be flat.

According to the above mentioned checking device for flatness of the drive chassis of the disc player of the present invention, in the state that the master pickup is movable on and parallel with the drive chassis by the transporting part, the first light sensing portion installed at the top of the transporting part projects a beam of light in a vertical downward direction and senses a beam of light reflected and returned from the detecting lens of the master pickup installed therebelow, whereby flatness of the drive chassis is checked.

That is, if the beam of light which is projected in a vertical downward direction from the first light sensing portion is directly returned, the drive chassis installed parallel with the master pickup is determined to be flat.

Furthermore, when the turntable on the drive chassis is rotated, the second light sensing portion installed at the top of the bracket part projects a beam of light in a vertical downward direction toward the turntable and senses a beam of light reflected and returned from the detecting lens, whereby flatness of the drive chassis when the turntable is mounted is checked.

Thus, it is possible to precisely check tilting or twisting over the whole surface of the drive chassis as the turntable and the optical pickup device are moved over the whole surface of the drive chassis.

Therefore, precise checking of components is accomplished and the properties of the recording/reproduction of information and tracking and focusing servos are improved due to the precise checking.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A checking device for flatness of a drive chassis of a disc player comprising:
- a supporting part for supporting the drive chassis, the supporting part having a bottom surface, side walls formed to be bent upwardly from edges of the bottom surface, and combining projectors projected on top surface of the side walls and installed at positions corresponding to combining holes of the drive chassis into which the combining projectors are to be inserted;
- a driving part for generating a driving force, the driving part being installed on the supporting part, and having a spindle gear rotatable by the driving force;
- a master pickup for being movable in a parallel direction with an upper surface of the drive chassis, the master pickup being guided by a guide rod which is supported on the drive chassis and parallel with the drive chassis, the master pickup having an optic reflecting an incident light;
- a transporting part having a first light sensing portion located above the drive chassis, the first light sensing portion projecting a beam of light toward the drive chassis in a vertical downward direction to the bottom surface of the supporting part from the first light sensing portion for checking flatness of the drive chassis, the transporting part having a rack gear portion being installed in a parallel direction with the supporting part, the rack gear portion being movable parallel with the supporting part by rotation of the spindle gear in an engaged state with the spindle gear of the driving part, and the transporting part being in contact with the master pickup so that the master pickup can be moved by a movement of the rack gear portion of the transporting part.

2. The checking device for flatness of a drive chassis of a disc player claimed in claim 1, wherein the supporting part has the bottom surface in a shape of a flat board, four side walls which are orthogonal to each other, and the combining projectors which are projected on top surfaces of two opposite side walls, and the supporting part having stairs formed on top surfaces of the other two opposite side walls for stably combining with the drive chassis.

3. The checking device for flatness of a drive chassis of a disc player as claimed in claim 1, wherein the transporting part has a body portion bent upwardly from the rack gear portion and extended to the first light sensing portion located above the drive chassis, and the master pickup makes contact with the body portion and can be moved depending on a movement of the body portion.

4. The checking device for flatness of a drive chassis of a disc player as claimed in claim 1, wherein the master pickup is constructed so that one end is guided by guide rod supported on the drive chassis and the other end is directly supported by a contacting projector so that the master pickup is movable parallel with the upper surface of the drive chassis.

5. The checking device for flatness of a drive chassis of a disc player as claimed in claim 4, wherein the contacting projector has a hemispheric shape and makes contact with the upper surface of the drive chassis.

6. The checking device for flatness of a drive chassis of a disc player as claimed in claim 1, wherein the first light sensing portion and the master pickup are arranged on a vertical line to the bottom surface of the supporting part so that a projected beam from the first light sensing portion is reflected to be returned by the optic of the master pickup when the point of the drive chassis on which the master pickup is installed is flat.

7. The checking device for flatness of a drive chassis of a disc player as claimed in claim 6, wherein the master pickup is constructed so that one end is guided by the guide rod supported on the drive chassis and the other end is directly supported by a contacting projector so that the master pickup is movable parallel with the upper surface of the drive chassis.

8. The checking device for flatness of a drive chassis of a disc player as claimed in claim 7, wherein the contacting projector has a hemispheric shape and makes contact with the upper surface of the drive chassis.

9. The checking device for flatness of a drive chassis of a disc player as claimed in claim 1, wherein heights of the opposite side walls of the supporting part are determined so that one side wall close to a starting position of a checking operation is lower and the other side wall close to an ending position of the checking operation is higher, and that the master pickup is stably transported depending on a movement of the transporting part.

10. The checking device for flatness of a drive chassis of a disc player comprising:
- a supporting part for supporting a drive chassis, the supporting part having a bottom surface in a shape of a flat board, four side walls which are orthogonal to each other, combining projectors which are projected on top surfaces of two opposite side walls of the four side walls and installed at positions corresponding to combining holes of the drive chassis into which the combining projectors are to be inserted, and stairs formed on top surfaces of the other two opposite side walls for stably combining with the drive chassis;
- a driving part for generating a driving force, the driving part being installed on the supporting part, and having a spindle gear rotatable by the driving force;
- a master pickup installed on the drive chassis, the master pickup having an optic reflecting an incident beam of light, the master pickup being constructed so that one end is guided by guide rod supported on the drive chassis and the other end is directly supported by a contacting projector so that the master pickup is movable parallel with the upper surface of the drive chassis, and the contacting projector having a hemispheric shape and making contact with the upper surface of the drive chassis;
- a transporting part having a first light sensing portion located above the drive chassis, the first light sensing portion projecting a beam of light toward the drive chassis in a vertical downward direction to the bottom surface of the supporting part from the first light sensing portion for checking flatness of the drive chassis, the first light sensing portion and the master pickup are arranged on a vertical line to the bottom surface of the supporting part so that a projected beam from the first light sensing portion is reflected to be returned by the optic of the master pickup when the point of the drive chassis on which the master pickup is installed is flat, the transporting part having a rack gear portion being installed in a parallel direction with the supporting part, the rack gear portion being movable parallel with the supporting part by rotation of the spindle gear in an engaged state with the spindle gear of the driving part, and the transporting part making contact with the master pickup so that the master pickup can be moved by a movement of the rack gear portion of the transporting part.

11. A checking device for flatness of a drive chassis of a disc player comprising:
- a supporting part for supporting a driving chassis, the supporting part having a bottom surface, side walls formed to be bent upwardly from edges of the bottom surface, and combining projectors projected on top surface of the side walls and installed at positions corresponding to combining holes of the drive chassis into which the combining projectors are to be inserted;
- a driving part for generating a driving force, the driving part being installed on the supporting part, and having a spindle gear rotatable by the driving force;
- a master pickup for being movable in a parallel direction with an upper surface of the drive chassis so that the master pickup is guided by a guide rod which is supported on the drive chassis and parallel with the drive chassis, the master pickup having an optic reflecting an incident light;
- a transporting part having a first light sensing portion located above the drive chassis, the first light sensing portion projecting a beam of light toward the drive chassis in a vertical downward direction to the bottom surface of the supporting part from the first light sensing portion for checking flatness of the drive chassis, the first light sensing portion and the master pickup are arranged on a vertical line to the bottom surface of the supporting part so that a projected beam from the first light sensing portion is reflected to be returned by the optic of the master pickup when the point of the drive chassis on which the master pickup is installed is flat, the transporting part having a rack gear portion being installed in a parallel direction with the supporting part, the rack gear portion being movable parallel with the supporting part by rotation of the spindle gear in an engaged state with the spindle gear of the driving part, and the transporting part being in contact with the master pickup so that the master pickup can be moved by a movement of the rack gear portion of the transporting part; and
- a bracket part having a supporting plate which is extended to an upper part from the supporting part, an upper plate which is bent parallel with an upper surface of a turntable mounted on the drive chassis and which is extended to be positioned above the turntable, and a second light sensing portion installed on a bottom of the upper plate thereof for projecting light to the turntable and for sensing light returned from the turntable in order to check a rotational state of the turntable.

12. The checking device for flatness of a drive chassis of a disc player claimed in claim 11, wherein the supporting part has the bottom surface in a shape of a flat board, four side walls which are orthogonal to each other, and the combining projectors which are projected on top surfaces of two opposite side walls, and the supporting part having stairs formed on top surfaces of the other two opposite side walls for stably combining with the drive chassis.

13. The checking device for flatness of a drive chassis of a disc player as claimed in claim 11, wherein the transporting part has a body portion bent upwardly from the rack gear portion and extended to the first light sensing portion located above the drive chassis, and the master pickup makes contact with the body portion and can be moved depending on a movement of the body portion.

14. The checking device for flatness of a drive chassis of a disc player as claimed in claim 11, wherein the master pickup is constructed so that one end is guided by guide rod supported on the drive chassis and the other end is directly supported by a contacting projector so that the master pickup is movable parallel with the upper surface of the drive chassis.

15. The checking device for flatness of a drive chassis of a disc player as claimed in claim 14, wherein the contacting projector has a hemispheric shape and makes contact with the upper surface of the drive chassis.

16. The checking device for flatness of a drive chassis of a disc player as claimed in claim 11, wherein the first light sensing portion and the master pickup are arranged on a vertical line to the bottom surface of the supporting part so that a projected beam from the first light sensing portion is reflected to be returned by the optic of the master pickup when the point of the drive chassis on which the master pickup is installed is flat.

17. The checking device for flatness of a drive chassis of a disc player as claimed in claim 16, wherein the master pickup is constructed so that one end is guided by the guide rod supported on the drive chassis and the other end is directly supported by a contacting projector so that the master pickup is movable parallel with the upper surface of the drive chassis.

18. The checking device for flatness of a drive chassis of a disc player as claimed in claim 17, wherein the contacting projector has a hemispheric shape and makes contact with the upper surface of the drive chassis.

19. The checking device for flatness of a drive chassis of a disc player as claimed in claim 11, wherein heights of the opposite side walls of the supporting part are determined so that one side wall close to a starting position of a checking operation is lower and the other side wall close to an ending position of the checking operation is higher, and that the master pickup is stably transported depending on a movement of the transporting part.

20. The checking device for flatness of a drive chassis of a disc player comprising:
- a supporting part for supporting a drive chassis, the supporting part having a bottom surface in a shape of a flat board, four side walls which are orthogonal to each other, combining projectors which are projected on top surfaces of two opposite side walls of the four side walls and installed at positions corresponding to combining holes of the drive chassis into which the combining projectors are to be inserted, and stairs formed on top surfaces of the other two opposite side walls for stably combining with the drive chassis;
- a driving part for generating a driving force, the driving part being installed on the supporting part, and having a spindle gear rotatable by the driving force;
- a master pickup installed on the drive chassis, the master pickup having a detecting lens reflecting an incident beam of light, the master pickup being constructed so that one end is guided by a guide rod supported on the drive chassis and the other end is directly supported by a contacting projector so that the master pickup is movable parallel with the upper surface of the drive chassis, and the contacting projector having a hemispheric shape and making contact with the upper surface of the drive chassis;
- a transporting part having a first light sensing portion located above the drive chassis, the first light sensing portion projecting a beam of light toward the drive chassis in a vertical downward direction to the bottom surface of the supporting part from the first light sensing portion for checking flatness of the drive chassis, the first light sensing portion and the master pickup are arranged on a vertical line to the bottom surface of the supporting part so that a projected beam from the first light sensing portion is reflected to be returned by the optic of the master pickup when the point of the drive chassis on which the master pickup is installed is flat, the transporting part having a rack gear portion being installed in a parallel direction with the supporting part, the rack gear portion being movable parallel with the supporting part by rotation of the spindle gear in an engaged state with the spindle gear of the driving part, and the transporting part making contact with the master pickup so that the master pickup can be moved by a movement of the rack gear portion of the transporting part; and a bracket part having a supporting plate which is extended to an upper part from the supporting part, an upper plate which is bent parallel with an upper surface of a turntable mounted on the drive chassis and which is extended to be positioned above the turntable, and a second light sensing portion installed on a bottom of the upper plate thereof for projecting light to the turntable and for sensing light returned from the turntable in order to check a rotational state of the turntable.

* * * * *